(12) United States Patent
Yamaguchi et al.

(10) Patent No.: US 6,268,868 B1
(45) Date of Patent: Jul. 31, 2001

(54) INFORMATION DISPLAYING APPARATUS

(75) Inventors: Nobuyasu Yamaguchi; Satoshi Sano; Fumihiko Nakazawa; Atsuo Iida; Fumitaka Abe, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/031,190

(22) Filed: Feb. 26, 1998

(30) Foreign Application Priority Data

Sep. 2, 1997 (JP) .................................................... 9-237541

(51) Int. Cl.[7] .................................................. G06F 15/00
(52) U.S. Cl. ............................................................ 345/433
(58) Field of Search .................................. 345/336, 418, 345/173, 419, 433, 430

(56) References Cited

U.S. PATENT DOCUMENTS

| | | | |
|---|---|---|---|
| 4,267,443 | 5/1981 | Carroll et al. | 250/221 |
| 5,376,948 | * 12/1994 | Roberts | 345/173 |

* cited by examiner

*Primary Examiner*—Phu K. Nguyen
(74) *Attorney, Agent, or Firm*—Armstrong, Westerman, Hattori, McLeland & Naughton, LLP

(57) ABSTRACT

An information displaying apparatus having a display unit for displaying information on a display screen 10, an indicator detector provided in the vicinity of the display screen 10 for detecting a position in a predetermined area on the display screen 10 indicated by an indicator and a size of the indicator, and an image control unit 52 for displaying an image on the screen 10 of the display unit according to the detected result by the indicator detector, wherein the image control unit 52 displays images on the display screen 10 of the display unit in different manners according to the position and/or size of the indicator detected by the indicator detector. According to this apparatus, for example, a thickness of one line can be changed and can be changed in steps during the drawing without specifying a size of a point and a thickness of a line to be drawn before the drawing operation. Moreover, subtle blur, etc. obtained in such a manner that an image is drawn by a writing brush dripped in the ink can be expressed.

16 Claims, 9 Drawing Sheets

INFORMATION DISPLAYING APPARATUS

BACKGROUND OF THE INVENTION

The present invention relates to an information displaying apparatus for detecting an indicated position and/or size of an indicator on a display screen of a display unit on which information is displayed by a computer system, etc., and directly displaying the detected result on the display screen of the display unit, or for displaying the detected result on a display screen which is superimposed on the display screen of the display unit.

BRIEF SUMMARY OF THE INVENTION

According to spread of computer systems such as personal computers, a device, which inputs new information and gives various instructions to a computer system by indicating a display screen of a display unit where information is displayed by the computer system using a human finger or a specified indicator, is being utilized.

In the case where such information displayed on the display screen of the display unit such as a personal computer is inputted by a touching method, it is necessary to accurately detect a touched position (indicated position) on the display screen. As a method of detecting the indicated position on the display screen to be a coordinate surface, "Carol methods" (U.S. Pat. No. 4,267,443) is known. In this method, by positioning light emitting elements and light receiving elements in a frame on a front face of the display screen so that they face each other, a light matrix is provided to the front face of the display screen, and a position at which a light is blocked by a finger or pen is detected. According to such a method, high SN ratio is obtained, so it is possible to expand an application to a large-size display unit, but since resolution of detection is in proportion to an interval between the light emitting elements and light receiving elements, it is necessary to narrow the interval therebetween to improve the resolution of detection. Therefore, also in the case where a large-size screen is touched by a thin matter such as a point of a pen, when the touched position is detected accurately, there arises a problem such that a number of the light emitting elements and light receiving elements to be positioned becomes larger, and the arrangement becomes larger, and signal process becomes complicated.

In addition, another optical position detecting method is disclosed in Japanese Patent Application Laid-Open No. 57-211637 (1982). In this method, a focused light such as a laser beam is scanned angularly from outside of the display screen, an angle in which a dedicated pen exists is obtained from two timings of reflected lights from the dedicated pen having reflecting means, and the obtained angle is adapted to the principle of a triangulation so that a coordinate of a position is detected by calculation. By this method, a number of parts can be decreased greatly, and high resolution can be obtained. However, there is a problem in operability such that a dedicated reflecting pen must be used, and it is impossible to detect the position of a finger, arbitrary pen, etc.

Further, still another optical position detecting method is suggested in Japanese Patent Application Laid-Open No. 62-5428 (1987). In this method, a light recursive reflector is disposed at both frames of the display screen, return lights from the light recursive reflectors of the light beam which has been scanned angularly are detected, an existence angle of the finger or pen is obtained from the timing that the light beam is blocked by the finger or pen so that a coordinate of a position is detected from the obtained angle according to the principle of a triangulation. By this method, an accuracy in detection can be maintained with a number of parts being small, and a position of a finger, arbitrary pen, etc. can be also detected.

As the adaptation of the above-mentioned device, a device, which draws an image by making an indicator move on a display screen, has been already put into practice. However, in such a conventional device, it was necessary to specify a size of a point and a thickness of a line to be drawn before drawing, so it was impossible to change a thickness of one line and change it in steps during drawing. The same was applied to colors, shading, brightness, etc. Moreover, in order to erase a portion which was once drawn, it was necessary to start a so-called erasing function. Further, it was impossible to draw such an image with a writing brush dripped in the ink, namely, to express subtle blur.

The present invention is devised in view of such reasons, and it is an object to provide an information displaying apparatus which is capable of drawing various images on a display screen according to sizes of indicators detected by the indicator detector, and of drawing various images on the display screen also according to a moving velocity, moving direction, etc. of the indicators.

A first aspect of an information displaying apparatus of the invention is characterized by comprising: a display unit for displaying information on a display screen; an indicator detector for detecting a position and a size of an indicator when the indicator indicates within a predetermined area on the display screen; and display controlling means for displaying an image on the screen of the display unit according to the detected result of the indicator detector, wherein the display controlling means displays images on the display screen in different manners according to the position and/or size of the indicator detected by the indicator detector.

A second aspect of the information displaying apparatus of the invention is characterized in that the indicator detector in the first aspect includes: light recursive reflecting means provided to the outside of the predetermined area; at least two pairs of light transmitting and receiving means having light scanning means for angularly scanning a light in a surface which is substantially parallel with the predetermined area, and light receiving means for receiving a reflected light from a portion which is irradiated by the light, by the light recursive reflecting means; measuring means for measuring an range of the predetermined area formed by the indicator in which the scanning light is intercepted based on the scanning angle in the light scanning means and the receiving result of the light in the light receiving means; and calculating means for calculating a position and size of the indicator based on the measured result by the measuring means.

A third aspect of the information displaying apparatus of the invention is characterized in that the display controlling means in the first or second aspect displays points with different sizes and/or lines with different thicknesses on the display screen of the display unit according to the size of the indicator detected by the indicator detector.

A fourth aspect of the information displaying apparatus characterized in that the display controlling means in the first or second aspect displays images on the display screen of the display unit so that one of color, shading and brightness of the images is different according to the size of the indicator detected by the indicator detector.

A fifth aspect of the information displaying apparatus is characterized in that the display controlling means in the first or second aspect displays images on the display screen of the display unit by a first drawing method when the size of the indicator detected by the indicator detector is smaller than a predetermined value, and by a second drawing method when the size of the indicator exceeds the predetermined value.

A sixth aspect of the information displaying apparatus is characterized in that, in the second drawing method in the fifth aspect, an image is drawn using the same color as a background color of the display screen of the display unit.

A seventh aspect of the information displaying apparatus is characterized in that, after the second drawing method in the sixth aspect is executed, the display controlling means continues the second drawing method until the indicator is not detected by the indicator detector.

An eighth aspect of the information displaying apparatus is characterized in that, in the first or second aspect, the indicator detector includes means for calculating a moving direction and moving velocity from the position of the indicator detected in time series; and the display controlling means displays images on the display screen of the display unit in different manners according to the position, size, moving direction and moving velocity of the indicator calculated by the indicator detector.

A ninth aspect of the information displaying apparatus is characterized in that, in the first and second aspect, the indicator is an object whose size is changeable on the surface which is parallel with the display screen according to a pressing force on the display screen; and the display controlling means displays an image, whose point and line respectively have a size and thickness according to the size of the indicator calculated by the indicator detector in time series, in a position of the display screen of the display unit according to the position of the indicator calculated by the indicator detector in time series.

The above and further objects and features of the invention will more fully be apparent from the following detailed description with accompanying drawings.

DETAILED DESCRIPTION OF THE PREFERRED EMBODIMENTS

The following describes the present invention in detail on reference to the drawings showing embodiments.

Figure 1:
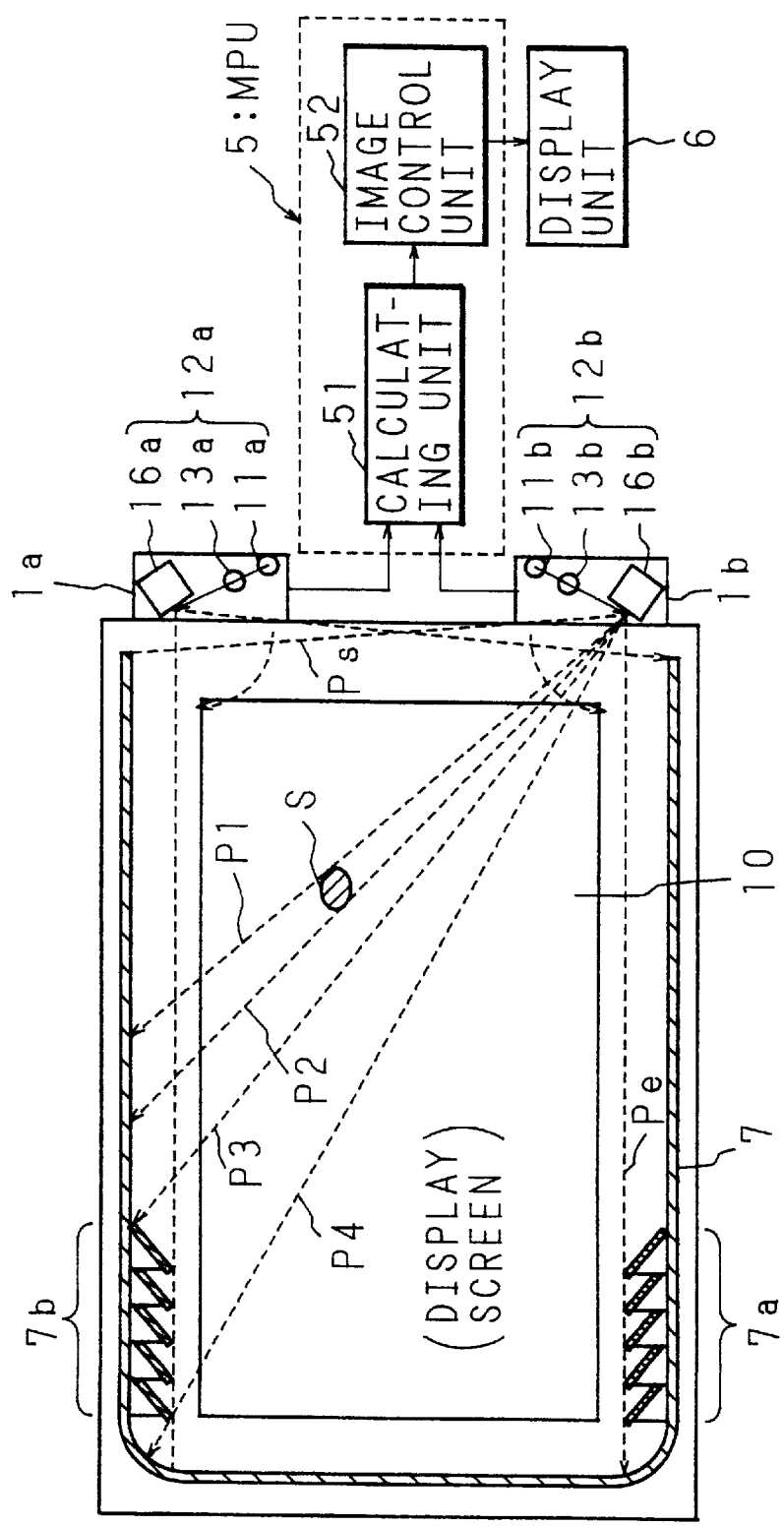
FIG. 1 is a schematic diagram showing a basic arrangement of an information displaying apparatus of one example of an embodiment of the present invention.

FIG. 1 is a schematic diagram showing an arrangement having an optical indicator detector as one example of an embodiment of the information displaying apparatus of the present invention.

In FIG. 1, the reference numeral 10 is a display screen such as a CRT or flat display panel (PDP, LCD, EL, etc.) in an electronic apparatus such as a personal computer, and such as a projecting-type image display unit, and in the present embodiment, this display screen is arranged as a PDP (Plasma Display) screen which is 51.8 cm long and 92.0 cm wide and 105.6 cm diagonal. As mentioned later, the outside of both corners of one short side (right side in the present embodiment) of the rectangular display screen 10 to be the first coordinate surface are respectively provided with light transmitting and receiving units 1a and 1b having an optical system including a light emitting element, light receiving element, polygon mirror, etc. therein. Moreover, the outside of three sides other than the right side of the display screen 10, namely, upper and lower sides and left side are provided with a recursive reflecting sheet 7.

Here, a reference symbol S represents a cross section of a human finger as an intercepter (indicator).

The light transmitting and receiving units 1a and 1b are mainly composed of light emitting elements 11a and 11b composed of a laser diode for emitting infrared laser beams, light receiving elements 13a and 13b for receiving reflected lights from the recursive reflecting sheet 7, square (in the present embodiment) polygon mirrors 16a and 16b, for angularly scanning the laser beams from the light emitting elements 11a and 11b, etc. Here, the light receiving elements 13a and 13b function as light receiving means, the light emitting elements 11a and 11b and the polygon mirrors 16a and 16b function as light scanning means. Two pairs of light transmitting and receiving units 1a and 1b, their signal processing systems, recursive reflecting sheet 7, etc. function as measuring means.

In such the arrangement, the laser beams emitted from the light emitting elements 11a and 11b are scanned angularly in a surface which is practically parallel with the display screen 10 by rotation of the polygon mirrors 16a and 16b to be projected on the recursive reflecting sheet 7. Then, the reflecting lights from the recursive reflecting sheet 7 are reflected by the polygon mirrors 16a and 16b to incide into the light receiving elements 13a and 13b. However, since in the case where an intercepter (indicator) exists on a light passage for the projected lights, the projected lights are intercepted, the reflected lights do not incide into the light receiving elements 13a and 13b. Here, the angular scanning of the laser beams with not less than 90° is realized by rotation of the polygon mirrors 16a and 16b.

In addition, the reference numeral 5 is an MPU for measuring and calculating a position and size of the intercepter (indicator) S such as a finger and pen and for controlling a whole operation of the apparatus. The MPU is composed of a calculating unit 51 for calculating a position and size of the indicator S according to the measured results by the measuring means. The image control unit 52 for controlling information to be displayed on the display unit 6 based on the calculated results by the calculating unit 51. Accordingly, an indicator detector is composed of the calculating unit 51 and the measuring means which is provided with the light transmitting and receiving units 1a and 1b, the recursive reflecting sheet 7, and the like. Here, the display unit 6 is shown independently in FIG. 1, but actually it also serves as the display screen 10.

In the information displaying apparatus of the present invention, as to the light transmitting and receiving unit 1b, for example, as shown in FIG. 1, the projected light from the light transmitting and receiving unit 1b is scanned in a counterclockwise direction in FIG. 1, and the scanning starting position is a position (Ps) where the light is reflected by an end portion of the recursive reflecting sheet 7. The projected light is reflected by the recursive reflecting sheet 7 until the scanning position comes to a position (P1) of one end of the intercepter S, but the light is blocked by the intercepter S until the scanning position comes to a position (P2) of the other end of the intercepter S. Then, the light is reflected by the recursive reflecting sheet 7 until the scanning position comes to a scanning end position (Pe).

However, in the light transmitting and receiving unit 1a, the light is scanned in the clockwise direction in FIG. 1. Here, the description will be given as to the reasons that the scanning of the light is started from the lower side of the display screen 10 in the clockwise direction in FIG. 1 by the light transmitting and receiving unit 1a and that the scanning of the light is started from the upper side of the display screen 10 in the counterclockwise direction in FIG. 1 by the light transmitting and receiving unit 1b.

For example, in the case of the light transmitting and receiving unit 1b, the upper side or left side of the display screen 10 may be a scanning starting direction, but when viewed from the light transmitting and receiving unit 1b, since the upper side of the display screen 10 is closer than the lower side, a reflected light amount therein is larger, and since the reflecting surface of the recursive reflecting sheet 7 is substantially right-angled on the upper side of the display screen 10, a reflected light amount thereon is larger. Therefore, the upper side of the display screen 10 is set as the scanning start direction. In other words, in the case of the light transmitting and receiving unit 1b, when the lower side of the display screen 10 is set as the scanning start direction, the upper side of the display screen 10 is closer than the lower side. For this reason, a reflected light amount thereon at the scanning start point becomes smaller, and since the reflecting surface of the recursive reflecting sheet 7 is bent, a reflected light amount thereon becomes smaller. However, the bent of the recursive reflecting sheet 7 does not become a problem practically, and needless to say, the arrangement such that the recursive reflecting sheet 7 is not bent can be adopted.

As shown in FIG. 1, the recursive reflecting sheet 7 has an opening on the side where the light transmitting and receiving units 1a and 1b are provided, and it is positioned in "U" shape so as to surround the display screen 10. Further, as represented by the reference numerals 7a and 7b, in portions where a light projecting angle from the light transmitting and receiving units 1a and 1b onto the recursive reflecting sheet 7 becomes smaller, more specifically, in portions of two sides (upper side and lower side in FIG. 1) intersecting perpendicularly to the side where the light transmitting and receiving units 1a and 1b are provided, these portions far from the light transmitting and receiving units 1a and 1b, the recursive reflecting sheet has a sawtooth shape.

Due to the sawtooth-shaped portions 7a and 7b of the recursive reflecting sheet, as the scanning of the projected light from the light transmitting and receiving unit 1b proceeds from the position Ps to a position P3 of one end of the sawtooth-shaped portion 7b of the recursive reflecting sheet, an angle in which the light incides into the recursive reflecting sheet 7 becomes smaller gradually. For this reason, a reflected light amount becomes smaller accordingly. However, since the projected light incides into the sawtooth-shaped portion 7b of the recursive reflecting sheet at a substantially right angle during the scanning from the position P3 of one end of the sawtooth-shaped portion 7b of the recursive reflecting sheet to the position P4 of the other end of the sawtooth-shaped portion 7b, further lowering of a recursive reflection factor is avoided.

Figure 2:
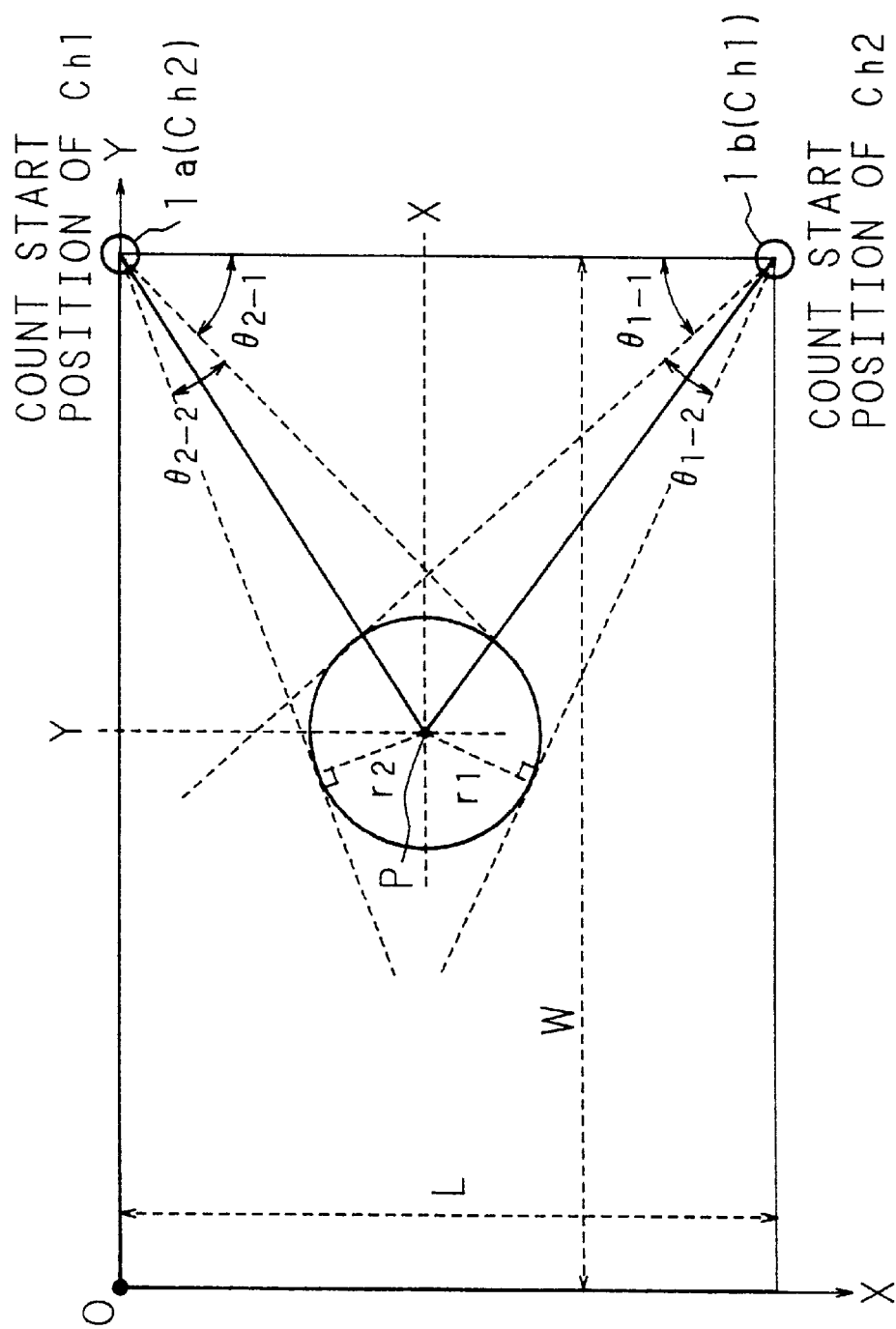
FIG. 2 is a schematic diagram showing the principle of a position detecting operation on a coordinate surface using the information displaying apparatus of the present invention.

The following describes a position detecting operation on a coordinate surface by the information displaying apparatus of the present invention on reference to a schematic diagram of FIG. 2 showing its principle. In addition, in FIG. 2, components other than the light transmitting and receiving units 1a and 1b, recursive reflecting sheet 7 and display screen 10 are not shown. Moreover, in the following description, the light transmitting and receiving unit 1b is set as a channel 1 (Ch1), and the light transmitting and receiving unit 1a is set as a channel 2 (Ch2).

The MPU 5 rotates the polygon mirrors 16a and 16b in the light transmitting and receiving units 1a and 1b by controlling a polygon control circuit 4, and the MPU 5 scans the laser beams from the light emitting elements 11a and 11b angularly. As a result, the reflected light from the recursive reflecting sheet 7 incides into the light receiving elements 13a and 13b. A receiving amount of the lights inciding into the light receiving elements 13a and 13b in such a manner is obtained as a light receiving signal which is an output of a signal processing circuit (not shown). A change in the level of the light receiving signal is detected as a scanning angle in both light scanning means 12a and 12b, and the process is performed according to the following method.

Here, information given to the calculating unit 51 of the MPU 5 are mainly the following four kinds of information shown in FIG. 2.

$\theta_{1\text{-}1}$: angle between starting of scanning of Ch1 (light transmitting and receiving unit 1b) and detection of the indicator S $\theta_{1\text{-}2}$: angle of a detection width of indicator S by the Ch1 (light transmitting and receiving unit 1b)

$\theta_{2\text{-}1}$: angle between starting of scanning of Ch2 (light transmitting and receiving unit 1a) and detection of the indicator S $\theta_{2\text{-}2}$: angle of a detection width of indicator S by the Ch2 (light transmitting and receiving unit 1a )

A coordinate P (center of the indicator S) to be obtained and a radius r of the indicator S are calculated according to following equations (1) through (6). In addition, in the case where the light transmitting and receiving units 1a and 1b are positioned along the left short side of the display screen 10 in FIG. 1, instead of the equations (4) through (6), equations (4'), (5') and (6') are used.

$$\theta_1 = \theta_{1\text{-}1} + \theta_{1\text{-}2}/2 \tag{1}$$

$$\theta_2 = \theta_{2\text{-}1} + \theta_{2\text{-}2}/2 \tag{2}$$

$$y = L * \tan\theta_1 / (\tan\theta_1 + \tan\theta_2) \tag{3}$$

$$x = W - y*\tan\theta_2 \quad (4)$$

$$r1 = ((W-x)^2 + y^2)^{1/2} * \sin(\theta_{2\text{-}2}/2) \quad (5)$$

or $$r2 = ((W-x)^2 + (L-y)^2)^{1/2} * \sin(\theta_{1\text{-}2}/2) \quad (6)$$

$$x = y*\tan\theta_2 \quad (4')$$

$$r1 = (x^2 + y^2)^{1/2} * \sin(\theta_{2\text{-}2}/2) \quad (5')$$

or $$r2 = (x^2 + (L-y)^2)^{1/2} * \sin(\theta_{1\text{-}2}/2) \quad (6')$$

Figure 3:
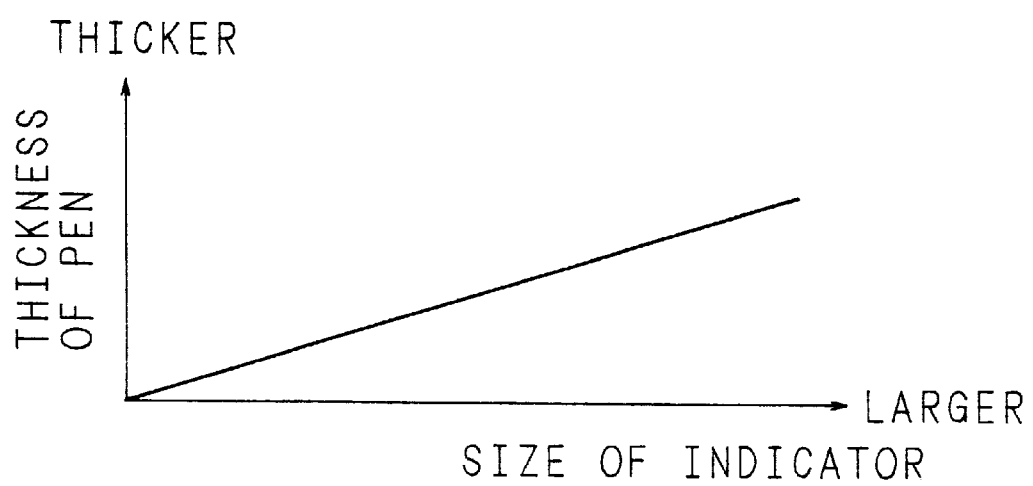
FIG. 3 is a graph showing a relationship between a calculated size of an indicator and a size of a point or a thickness of a locus (line) to be drawing according to the size of the indicator.

FIG. 3 is a graph showing a relationship between a size of the indicator S calculated by the calculating unit 51 in the information displaying apparatus with an optical position detector of the present invention and a size of a point or thickness of a locus (line) to be drawn on the display screen 10 by the image control unit 52 accordingly.

As shown in the graph in FIG. 3, in the information displaying apparatus of the present invention, a thickness of the indicator S is in proportion to a size and thickness of the images (point and line) displayed on the display screen 10 according to the thickness of the indicator S. This processing procedure is shown in a flow chart in FIG. 4.

First, the calculating unit 51 obtains data of one measured result $\theta_{1\text{-}1}$, $\theta_{1\text{-}2}$, $\theta_{2\text{-}1}$ and $\theta_{2\text{-}2}$ from the measuring means (S11), and a position of the indicator S is detected (S12), and a size of the indicator S is detected (S13) based on the data. When the position and size of the indicator S are determined, the image control unit 52 determines a thickness of a pen according to the size of the indicator S (S14). When an images are successively displayed on a position corresponding to the detected position of the indicator S on the display screen 10, a locus of the indicator S is drawn (S15) in such a manner that this image is drawn by using the pen with the thickness. This process is repeated every time data are given from the measuring means to the calculating unit 51 and image control unit 52.

In this embodiment, for example, an application such that a stick-like object which is writing instruments such as marker ink is used as the indicator S, and the indicator S is moved on the display screen 10 to draw a curved locus is considered. In this case, in the present embodiment, since the image control unit 52 draws a locus with a thickness being in proportion to the detected size of the indicator S, when the indicator S with small thickness is used, a thin line is drawn, and when the indicator S with large thickness is used, a thick line is drawn.

In addition, in the case where an object such as a writing brush whose thickness is continuously changed according to a pressing force and pressing direction is used as the indicator S, since a thickness of the writing brush as the indicator S is changed continuously, a thickness of a line which is drawn on the display screen 10 by the image control unit 52 is also changed continuously.

Figure 5:
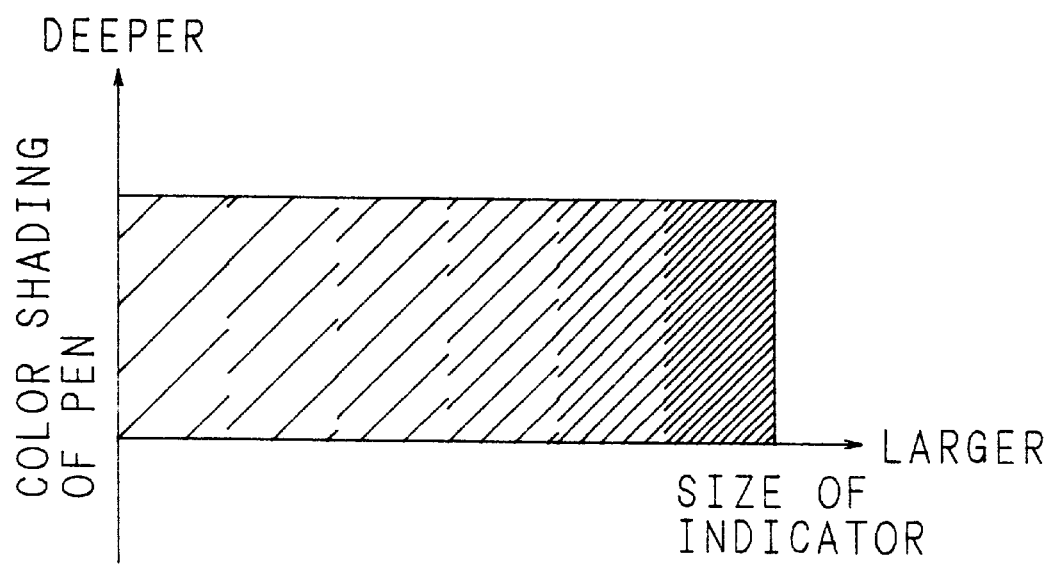
FIG. 5 is a graph showing a relationship between a calculated size of the indicator and shading of a color of a pen to be used for drawing an image on the display screen.

FIG. 5 is a graph showing a relationship between the size of the indicator S calculated by the calculating unit 51 and shading of a color of the pen to be used for drawing an image such as a locus on the display screen 10. In the case where an object such as a writing brush whose thickness is changed continuously according to its pressing force and pressing direction is used as the indicator S, when the strength of a brushstroke is increased, its locus becomes thicker. Moreover, in the case where the writing brush is actually used, when the strength of the brushstroke is increased, a deep line is drawn. Therefore, in the present embodiment, it is possible to draw a locus whose depth is in proportion to a size of the indicator S calculated by the calculating unit 51 on the display screen 10 to show an effect of color shading in such a manner that an image is drawn by actually using a writing brush.

Figure 4:
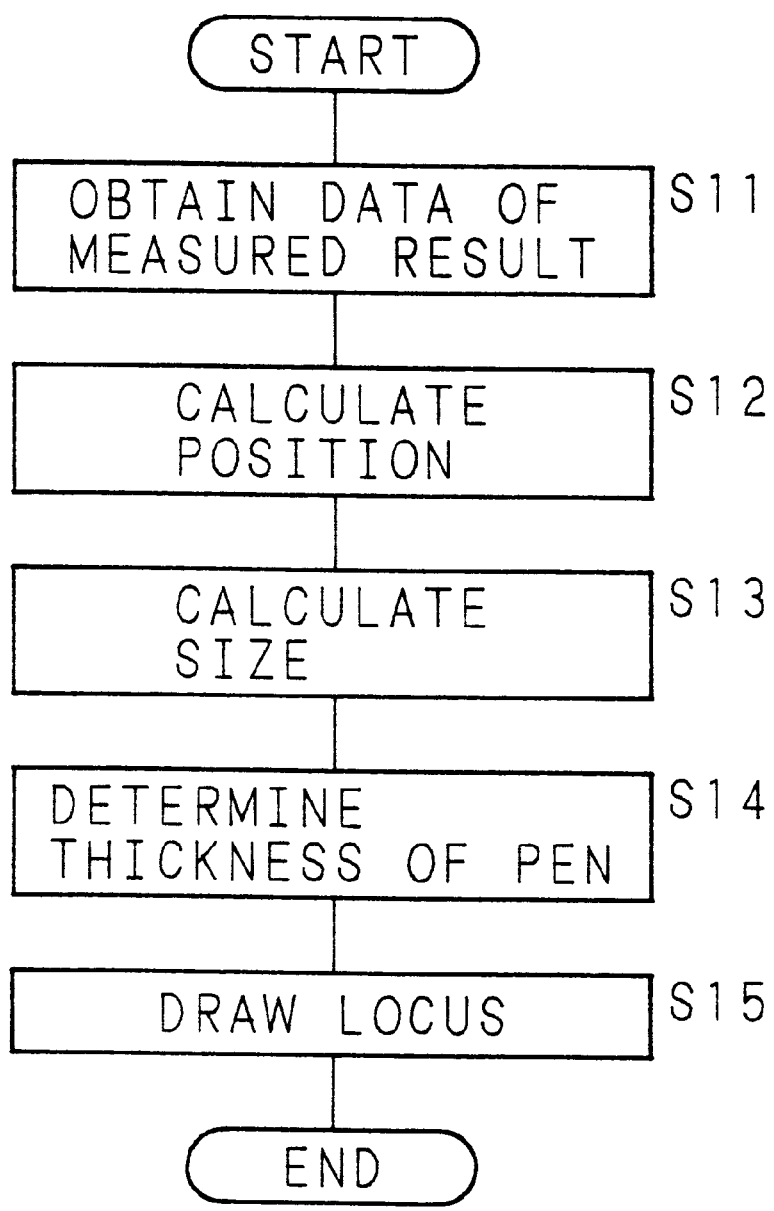
FIG. 4 is a flow chart showing a processing procedure in the information displaying apparatus of the present invention.

Here, the present embodiment can be realized by determining drawing depth at S14 according to a size of the indicator S calculated by the calculating unit 51 at S13 in the flow chart of FIG. 4.

Figure 6:
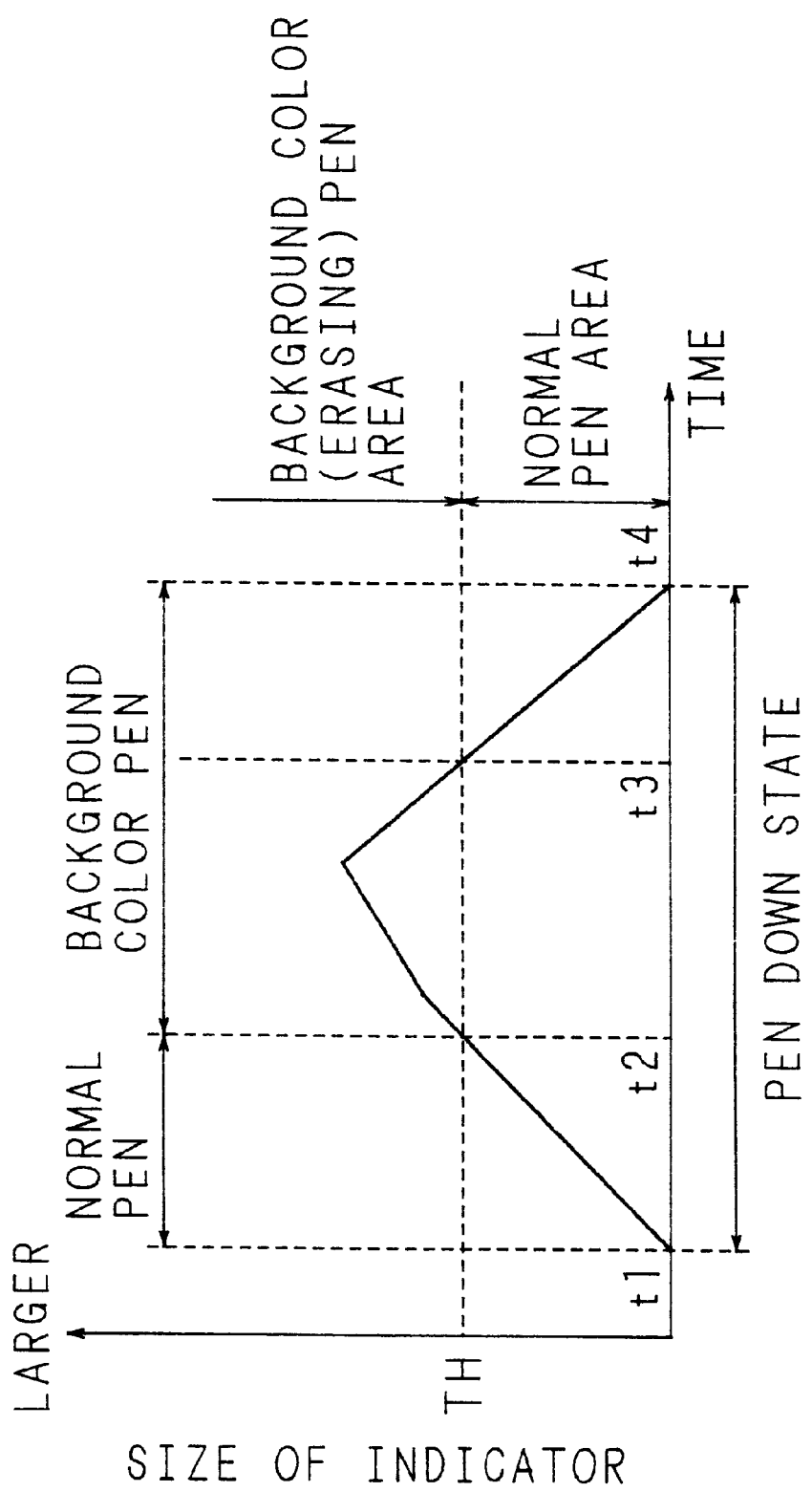
FIG. 6 is a graph showing a change with time of a calculated size of the indicator and a method of drawing an image on the display screen according to the change.

FIG. 6 is a graph showing a change with time in a size of the indicator S calculated by the calculating unit 51 and a method of drawing an image on the display screen 10 accordingly. In the present embodiment, in the case where a size of the indicator S calculated by the calculating unit 51 is not more than a certain threshold value TH between the time t1 and t2, general drawing with a pen is selected, and a line, which has a color previously selected (or color of default) by an operator and thickness or depth according to a size of the indicator S calculated by the calculating unit 51, is drawn on the display screen 10.

In the case where a size of the indicator S detected by the calculating unit 51 becomes not less than a certain threshold value TH between the time t2 and t3, a line with the same color as a background color is drawn on the display screen 10. In addition, a size of the locus at this time (thickness of the line) should be a thickness according to the threshold value TH. As a result, before the size of the indicator S calculated by the calculating unit 51 reaches the threshold value TH, the erasing function for erasing the locus drawn on the display screen 10 is selected.

In the state that the erasing function is operated, when the indicator S is removed from the display screen 10, more specifically it is removed from the detecting range of the indicator detector, in the case where an object such as an aforementioned writing brush whose thickness is continuously changed according to its pressing force or pressing direction is used as the indicator S, timing such that the result of calculating a size of the indicator S by the calculating unit 51 becomes smaller than the threshold value TH shown in FIG. 6 surely occurs. Therefore, at this timing, the erasing function is canceled, and the normal function for drawing with pen is returned.

When such a situation arises, just before the indicator S is removed by effort from the screen where an image is erased by the erasing function, an image is again drawn. Therefore, in the present embodiment, in order to avoid such a situation, when a specific function, more specifically in this example, the erasing function is selected, even if the result of calculating a size of the indicator S by the calculating unit 51 becomes not more than the threshold value TH, the specific function, namely, the erasing function is maintained until the indicator S is completely removed from the display screen 10.

Figure 7:
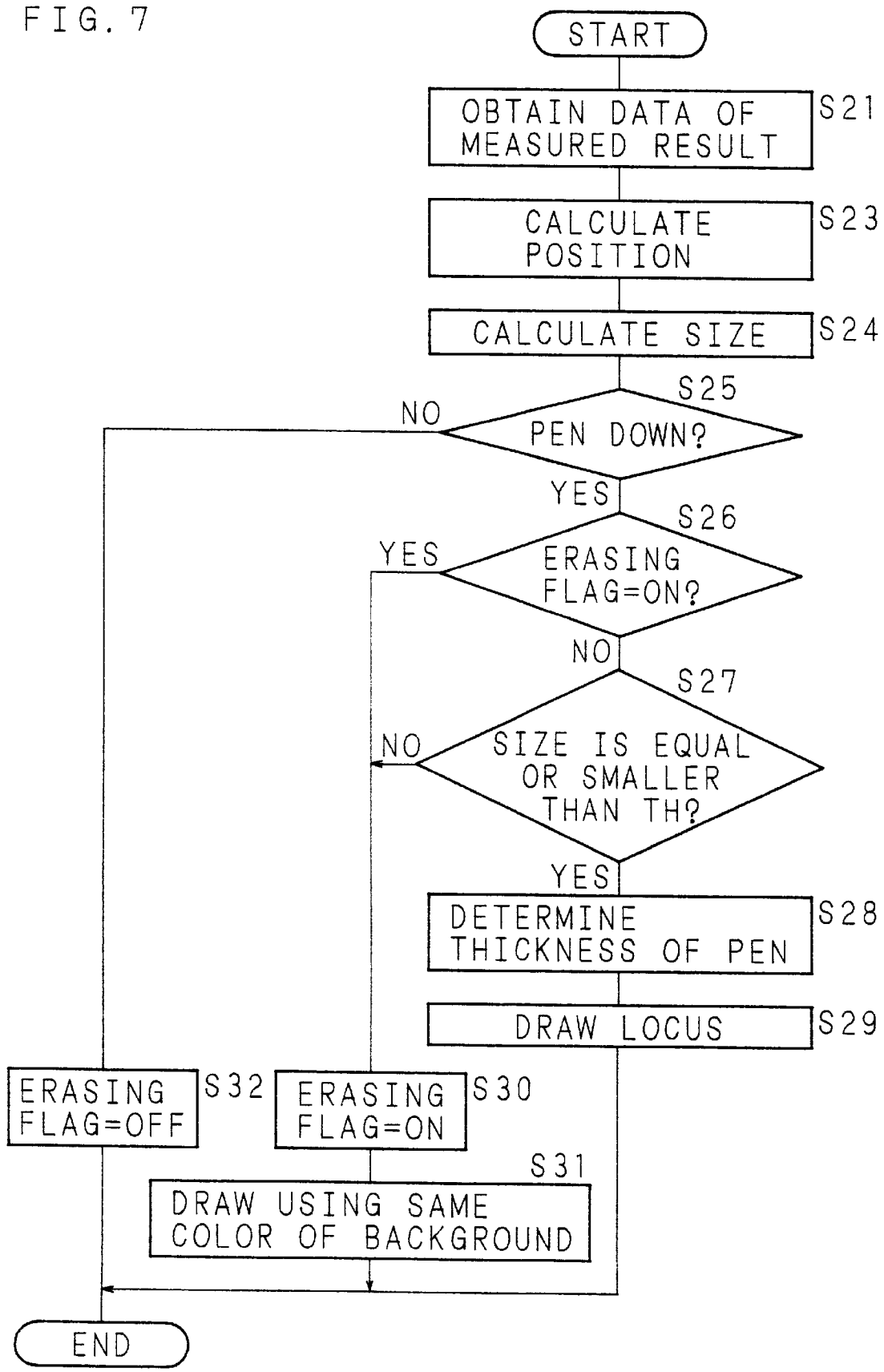
FIG. 7 is a flow chart showing a processing procedure in the information displaying apparatus of the present invention.

FIG. 7 is a flow chart showing the processing procedure in the present embodiment. First, the calculating unit 51 obtains the data of one measured result $\theta_{1\text{-}1}$, $\theta_{1\text{-}2}$, $\theta_{2\text{-}1}$ and $\theta_{2\text{-}2}$ from the measuring means (S21), and it calculates a position of the indicator S (S22) and calculates a size of the indicator S (S23) based on the data. When the position and size of the indicator S are determined, the calculating unit 51 judges as to whether or not a pen-down state is obtained (S25). Here, the pen-down state is such a state that the indicator S is pressed down on the display screen 10 and a size of the indicator S can be normally calculated by the calculating unit 51.

When the calculating unit 51 judges "NO", namely, that the pen-down state is not obtained at S25, the calculating unit 51 turns the erasing flag to "OFF" and cancels the erasing function (S32). In this case, the image control unit 52 does not perform the drawing operation on the display screen 10.

Meanwhile, when the calculating unit 51 judges "YES", namely, that the pen-down state is obtained at S25, the calculating unit 51 judges as to whether or not the erasing flag is "ON" (S26). When the erasing flag is "ON" ("YES" at S26), the image control unit 52 keeps the erasing flag "ON" to perform the drawing operation using the same color as the background color (S30 and S31).

On the contrary, when "NO" at S26, the calculating unit 51 judges as to whether or not a calculated value of a size of the indicator S is not more than the threshold value TH (S27). When "Yes", a thickness of the pen, namely, a thickness of a locus to be drawn on the display screen 10 is determined (S28), and the actual drawing operation is performed (S29).

However, when "NO" at S27, the calculating unit 51 turns the erasing flag to "ON" at S30 and makes the erasing function effective, and the drawing operation is performed using the same color as the background color at S31. The above processing is repeated every time data are given from the measuring means to the calculating unit 51 and image control unit 52.

Figure 8:
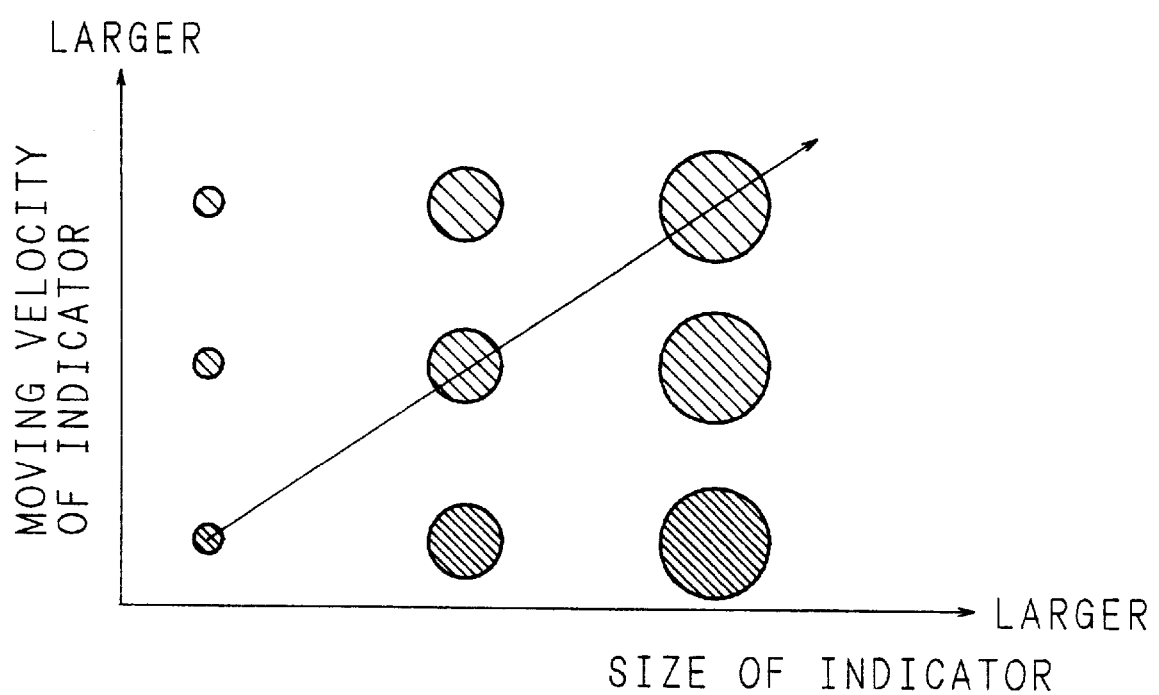
FIG. 8 is a graph showing a relationship between a calculated size and moving velocity of the indicator and a thickness (or shading) of a pen to be used for drawing an image on the display screen.

FIG. 8 is a graph showing a relationship between a size and moving velocity of the indicator S calculated by the calculating unit 51 and a thickness of the pen (or shading) used for drawing on the display screen 10.

The information displaying apparatus of the present invention can detect the position and size of the indicator S in time series. Moreover, the moving velocity and moving direction of the indicator S can be also calculated from the change with time in the position of the indicator S. Therefore, in the present embodiment, by drawing a locus whose thickness is in proportion to the size of the indicator S or whose depth is in inverse proportion to the moving velocity of the indicator S on the display screen 10, a state such that a character is written by a writing brush is reproduced.

In the case where a writing brush, for example, is actually used, a thick line can be drawn by increasing the strength of a brushstroke to crush the point of the writing brush. Meanwhile, a blurred or thin line can be drawn by increasing the velocity of the point of the writing brush. The present embodiment can show the effects of the thickness and shading of a color obtained in such a manner a line is drawn by actually using a writing brush.

Figure 9:
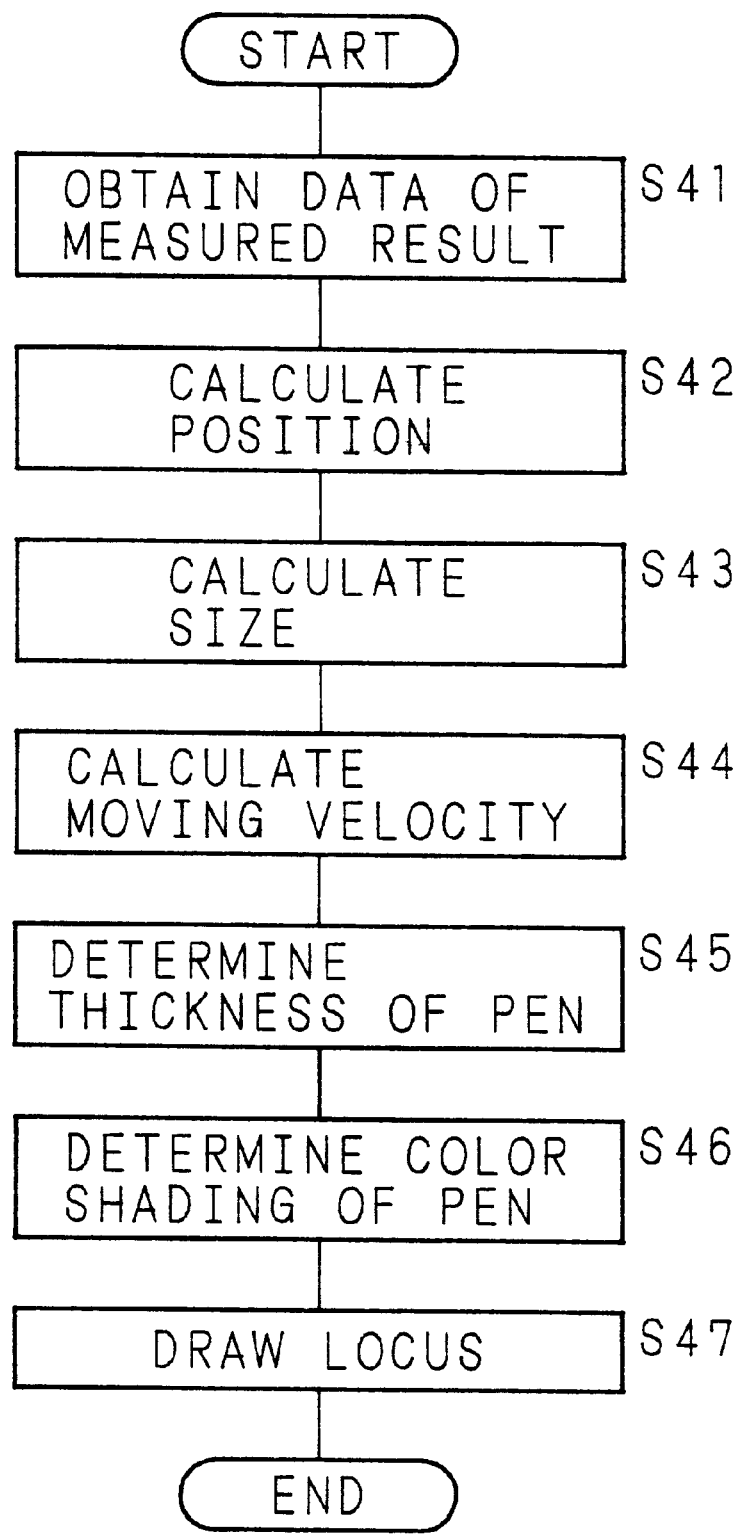
FIG. 9 is a flow chart showing a processing procedure in the information displaying apparatus of the present invention.

FIG. 9 is a flow chart showing the processing procedure in the present embodiment. First, the calculating unit 51 obtains data of one measured result $\theta_{1-1}$, $\theta_{1-2}$, $\theta_{2-1}$ and $\theta_{2-2}$ from the measuring means (S41), and a position of the indicator S is calculated (S42) and a size of the indicator S is calculated (S43) based on the data. Further, a moving velocity of the indicator S is calculated (S44). When the moving velocity of the indicator S is calculated, the image control unit 52 determines a thickness of the pen according to the size of the indicator (S45) and determines shading of the pen according to the moving velocity of the indicator S (S46). Then, when images are successively displayed on a position according to the detected position of the indicator S on the display screen 10 in such a manner that such images are drawn by using the pen having thickness and shading determined in such a way, a locus of the indicator S is drawn (S47). The above process is repeated every time data are given from the measuring means to the calculating unit 51 and image control unit 52.

Note that, in the above mentioned embodiment, the optical indicator detector for detecting the position and size of the indicator is used. It is not to say, however, other optical detector such as abovementioned Carol method, and the like, further, methods besides optical method such as an ultrasonic surface acoustic wave method, or a pressure sensitive method using electric resistance or capacity change, and the like may be used.

As mentioned above, according to the information displaying apparatus of the present invention, without specifying a size of a point and a thickness of a line to be drawn before the drawing operation, for example, a thickness of one line can be changed and can be changed in steps during the drawing. The same is applied to colors, shading, brightness, etc. Moreover, the so-called erasing function for erasing a portion which has been once drawn can be also started without special operation. Further, subtle blur obtained by drawing an image with a writing brush dripped in the ink can be expressed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An information displaying apparatus, comprising:
a display unit for displaying information on a display screen;
an indicator detector for detecting a position of an indicator when said indicator indicates within a predetermined area on said display screen, and a size of an area of the display screen to which said indicator substantially touches or in physical contact therewith; and
display controlling means for displaying an image on said screen of said display unit according to the detected result of said indicator detector,
wherein said display controlling means displays images on said display screen in different manners according to the position of said indicator detected by said indicator detector and the size of the area of the display screen to which said indicator substantially touches or in physical contact therewith.

2. The information displaying apparatus as set forth in claim 1, wherein said display controlling means displays points with different sizes or lines with different thicknesses on said display screen of said display unit according to the size of the display area to which the indicator substantially touches or in physical contact therewith.

3. The information displaying apparatus as set forth in claim 1, wherein said display controlling means displays images on said display screen of said display unit so that one of color, shading and brightness of the images is different according to the size of the display area to which the display area to which the indicator substantially touches.

4. The information displaying apparatus as set forth in claim 1, wherein said display controlling means displays images on said display screen of said display unit by a first drawing method when the is smaller than a predetermined value, and by a second drawing method when the exceeds the predetermined value.

5. The information displaying apparatus as set forth in claim 4, wherein, in the second drawing method, an image is drawn using the same color as a background color of said display screen of said display unit.

6. The information displaying apparatus as set forth in claim 5, wherein, after the second drawing method is executed, said display controlling means continues the second drawing method until said indicator is not detected by said indicator detector.

7. The information displaying apparatus as set forth in claim 1, wherein:
said indicator detector includes means for calculating a moving direction and moving velocity from the position of said indicator detected in time series; and
said display controlling means displays images on said display screen of said display unit in different manners according to the position, size, moving direction and moving velocity of said indicator calculated by said indicator detector.

8. The information displaying apparatus as set forth in claim 1, wherein:
said indicator is an object whose size is changeable on the surface which is parallel with said display screen according to a pressing force on said display screen; and
said display controlling means displays an image, whose point and line respectively have a thickness according to the calculated by said indicator detector in time series, in a position of said display screen of said display unit according to the position of said indicator calculated by said indicator detector in time series.

9. The information displaying apparatus as set forth in claim 1, wherein
said indicator detector includes:
light recursive reflecting means provided to the outside of said predetermined area;
at least two pairs of light transmitting and receiving means having light scanning means for angularly scanning a light in a surface which is substantially parallel with said predetermined area, and light receiving means for receiving a reflected light from a portion which is irradiated by the light, by said light recursive reflecting means;
measuring means for measuring an range of said predetermined area formed by said indicator in which the scanning light is intercepted based on the scanning angle in said light scanning means and the receiving result of the light in said light receiving means; and
calculating means for calculating a position and size of the display area to which the indicator substantially touches based on the measured result by said measuring means.

10. The information displaying apparatus as set forth in claim 9, wherein said display controlling means displays points with different sizes or lines with different thickness on said display screen of said display unit according to the size of an area of the display screen to which the indicator substantially touches or in physical contact therewith.

11. The information displaying apparatus as set forth in claim 9, wherein said display controlling means displays images on said display screen of said display unit so that one of color, shading and brightness of the images is different according to the size of the indicator detected by said indicator detector.

12. The information displaying apparatus as set forth in claim 9, wherein said display controlling means displays images on said display screen of said display unit by a first drawing method when the size of said indicator detected by said indicator detector is smaller than a predetermined value, and by a second drawing method when the size of said indicator exceeds the predetermined value.

13. The information displaying apparatus as set forth in claim 12, wherein, in the second drawing method, an image is drawn using the same color as a background color of said display screen of said display unit.

14. The information displaying apparatus as set forth in claim 13, wherein, after the second drawing method is executed, said display controlling means continues the second drawing method until said indicator is not detected by said indicator detector.

15. The information displaying apparatus as set forth in claim 9, wherein:
said indicator detector includes means for calculating a moving direction and moving velocity from the position of said indicator detected in time series; and
said display controlling means displays images on said display screen of said display unit in different manners according to the position, size, moving direction and moving velocity of said indicator calculated by said indicator detector.

16. The information displaying apparatus as set forth in claim 9, wherein:
said indicator is an object whose size is changeable on the surface which is parallel with said display screen according to a pressing force on said display screen; and
said display controlling means displays an image, whose point and line respectively have a size and thickness according to the size of said indicator calculated by said indicator detector in time series, in a position of said display screen of said display unit according to the position of said indicator calculated by said indicator detector in time series.

* * * * *